ян

(12) United States Patent
Stiesdal (10) Patent No.: US 9,995,283 B2
(45) Date of Patent: Jun. 12, 2018

(54) SLIDING BEARING ARRANGEMENT FOR A WIND TURBINE

(71) Applicant: Siemens Aktiengesellschaft, München (DE)

(72) Inventor: Henrik Stiesdal, Odense C (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days. days.

(21) Appl. No.: 15/397,846

(22) Filed: Jan. 4, 2017

(65) Prior Publication Data
US 2017/0260970 A1    Sep. 14, 2017

(30) Foreign Application Priority Data
Mar. 14, 2016 (EP) .................................. 16160125

(51) Int. Cl.
*F16C 17/10* (2006.01)
*F16C 17/26* (2006.01)
(Continued)

(52) U.S. Cl.
CPC ............. *F03D 80/50* (2016.05); *F03D 80/70* (2016.05); *F16C 17/10* (2013.01); *F16C 17/26* (2013.01);
(Continued)

(58) Field of Classification Search
CPC .......... F16C 17/02; F16C 17/04; F16C 17/10; F16C 17/107; F16C 17/12; F16C 17/26; F16C 2360/31; F16C 43/02; F16C 33/26; F03D 80/50; F03D 80/70; F05B 2230/80; F05B 2240/50; F05B 2240/52–2240/54; Y02E 10/72; Y02E 10/722; Y02P 70/523
See application file for complete search history.

(56) References Cited

U.S. PATENT DOCUMENTS

| 9,797,378 B2 * | 10/2017 | Pedersen .................... F03D 9/25 |
| 2002/0051586 A1 * | 5/2002 | Orndorff, Jr. ........ B63H 23/326 384/98 |

(Continued)

FOREIGN PATENT DOCUMENTS

| EP | 2568167 A1 | 3/2013 |
| EP | 2657519 A1 | 10/2013 |

(Continued)

OTHER PUBLICATIONS

Extended European Search Report for EP Application No. 16160125.7, dated Aug. 23, 2016.

*Primary Examiner* — Alan B Waits
(74) *Attorney, Agent, or Firm* — Schmeiser Olsen & Watts LLP (57) ABSTRACT

A sliding bearing arrangement for a wind turbine and a method to service the bearing is provided. A sliding bearing arrangement of a wind turbine includes a first shaft and a second shaft, whereby a first radial sliding bearing is arranged between the shafts. The first radial sliding bearing includes bearing pads. The first shaft includes a collar, whereby the collar is arranged mainly perpendicular to the axis of rotation, and radially overlaps at least a part of a radial surface of the second shaft. The collar includes an opening to exchange the bearing pads of the first radial sliding bearing of the bearing arrangement.

15 Claims, 6 Drawing Sheets

(51) Int. Cl.
  *F16C 43/02* (2006.01)
  *F03D 80/50* (2016.01)
  *F03D 80/70* (2016.01)
  *F16C 17/02* (2006.01)
  *F16C 17/04* (2006.01)

(52) U.S. Cl.
  CPC .......... *F16C 43/02* (2013.01); *F05B 2230/80* (2013.01); *F05B 2240/52* (2013.01); *F05B 2240/53* (2013.01); *F05B 2240/54* (2013.01); *F16C 17/02* (2013.01); *F16C 17/04* (2013.01); *F16C 2360/31* (2013.01); *Y02E 10/72* (2013.01); *Y02P 70/523* (2015.11)

(56) References Cited

U.S. PATENT DOCUMENTS

| | | | | |
|---|---|---|---|---|
| 2011/0095537 A1* | 4/2011 | Numajiri | ............... | F03D 7/0204 290/55 |
| 2011/0254281 A1* | 10/2011 | Noda | .................... | F03D 7/0204 290/55 |
| 2011/0309628 A1* | 12/2011 | Corts | ....................... | F16C 17/06 290/55 |
| 2014/0086515 A1* | 3/2014 | Pedersen | ................. | F16C 17/03 384/282 |
| 2014/0086516 A1* | 3/2014 | Pedersen | ............. | F03D 11/0008 384/303 |
| 2014/0133985 A1* | 5/2014 | Mongeau | ............ | F03D 11/0008 416/95 |
| 2014/0161614 A1* | 6/2014 | Vervoorn | ............... | F03D 7/0224 416/148 |
| 2014/0321781 A1* | 10/2014 | Pedersen | ............. | F03D 11/0008 384/320 |
| 2015/0017000 A1* | 1/2015 | Sato | ........................ | F16C 17/10 416/174 |
| 2015/0133260 A1* | 5/2015 | Van Den Donker | . | F16C 17/107 475/331 |
| 2017/0051721 A1* | 2/2017 | Murakami | .............. | F03D 13/20 |

FOREIGN PATENT DOCUMENTS

| | | |
|---|---|---|
| EP | 2711569 A1 | 3/2014 |
| EP | 2863076 A1 | 4/2015 |

* cited by examiner

SLIDING BEARING ARRANGEMENT FOR A WIND TURBINE

CROSS-REFERENCE TO RELATED APPLICATIONS

This application claims priority to European application No. EP16160125.7, having a filing date of Mar. 14, 2016, the entire contents of which are hereby incorporated by reference.

FIELD OF TECHNOLOGY

The following relates to a sliding bearing arrangement for a wind turbine and a method to service the bearing.

BACKGROUND

A wind turbine comprises one or more rotor blades. The rotor blades are connected to a hub. The rotor blades and the hub form the rotor of a wind turbine. The wind interacts with the rotor and causes a rotation of the rotor. The rotation of the rotor is transferred to an electrical generator. The rotational energy of the rotor is there transferred into electrical energy.

The rotation of the rotor is often transferred over a shaft. The rotor, the shaft and the rotor of the generator are rotatable in respect to the stationary part of the wind turbine. The hub, and in cases the shaft, need to be connected to the stationary part of the wind turbine by a bearing.

In many wind turbines the rotation of the rotor is directly transferred to the generator without the use of a gear. These wind turbines are called direct driven wind turbines, or direct drive wind turbines.

The weight and the forces acting on the rotor of the wind turbine are transferred over at least one bearing from the rotatable part of the wind turbine to the stationary part. For higher loads a plain bearing, or sliding bearing, is used in the wind turbine.

The forces acting in the sliding bearing under operation lead to wear at the sliding surface. To improve the lifetime and serviceability of the wind turbine, the main bearing is equipped with bearing pads that are exchangeable.

The bearing pads need to be accessible to be exchanged. It is therefore known to remove at least a part of a sliding surface or a bearing shell of the sliding bearing, to access and exchange the bearing pads.

It is also known to provide an opening in the bearing or the support structure to access bearing pads.

This shows the disadvantage the openings, or parts that can be removed, weaken the bearing or the support structure. This leads to additional fatigue of the bearing of the structure.

SUMMARY

An aspect relates to an improved bearing arrangement, that provides access to exchange bearing pads while at the same time retaining the stability of the structure.

A sliding bearing arrangement of a wind turbine is disclosed, whereby the arrangement comprises a first shaft and a second shaft, whereby the shafts are arranged coaxially to each other and one of the shafts is rotatable in respect to the other shaft around a common axis of rotation.

A first radial sliding bearing is arranged between the shafts to support the rotatable shaft by the stationary shaft. The first radial sliding bearing comprises bearing pads.

The first shaft comprises a collar, whereby the collar is arranged mainly perpendicular to the axis of rotation and radially overlaps at least a part of a radial surface of the second shaft.

The collar comprises a first axial sliding bearing to support axial loads between the two shafts. The collar is connected to the first shaft at a first radial position of the collar and the first axial sliding bearing is connected to the collar at a second radial position of the collar.

The collar comprises an opening in the area between the first and the second radial position, to exchange the bearing pads of the first radial sliding bearing of the bearing arrangement.

The sliding bearing arrangement comprises a stationary shaft and a rotatable shaft. The rotatable shaft needs to be supported in radial and axial direction by the stationary shaft. Therefore, sliding bearings are arranged between the stationary shaft and the rotatable shaft. The rotatable shaft is supported by two radial sliding bearings and by two axial sliding bearings.

The stationary shaft and the rotatable shaft are hollow shafts that are arranged within each other, whereby the rotatable shaft is rotatable in respect to the stationary shaft around a common longitudinal axis.

A sliding bearing is also called a plain bearing, and can be a dry bearing, a hydrostatic bearing, or a hydrodynamic bearing, for example. The bearing can be lubricated by grease or oil respectively.

A first and a second radial sliding bearing are arranged between the two hollow shafts to support the rotatable shaft in respect to the stationary shaft in radial direction. To support the rotatable shaft in respect to the stationary shaft in axial direction, the first of the shafts comprises a collar.

This collar can be attached to the first shaft by connection means, or it can be formed together with the first shaft in one piece. The collar of the first shaft radially overlaps at least a part of a radial surface of the second shaft. An axial sliding bearing can be arranged between the surface of the collar pointing towards the radial surface of the second shaft and the surface of the second shaft.

The collar attached to the first shaft thus bridges the radial gap between the first shaft and the second shaft.

The collar is connected to the first shaft at a first radial position of the collar. An axial sliding bearing is attached to a second radial position of the collar. The radial area in between the first and the second radial position of the collar comprises openings.

The openings are arranged in a way that an access to the radial gap between the first shaft and the second shaft is provided. Thus, bearing pads present between the first shaft and the second shaft can be exchanged through the openings in the collar attached to the first shaft.

Thus, the bearing pads of the radial sliding bearing, present in the gap between the first shaft and the second shaft, can be exchanged easily through the openings in the collar attached to the first shaft without the need to disassemble the mechanical structure of the sliding bearing arrangement.

Thus, service to the sliding bearing can be performed very easily and without heavy equipment like cranes.

The second shaft comprises a collar that is arranged mainly parallel to the collar of the first shaft and at the first axial sliding bearing is located between the two collars.

A collar is attached to the first shaft. The collar is arranged in radial direction. A second collar is attached to the second shaft that is also arranged in a radial direction and thus leads in parallel to the first collar attached to the first shaft.

A first axial sliding bearing is located between the two collars. The first axial sliding bearing is attached to one of the collars and the surface of the bearing pads of the first axial sliding bearing act on the surface of the second collar.

Thus, axial forces from the second shaft can be supported by the collar of the first shaft.

The first shaft is the stationary shaft.

The sliding bearing arrangement comprises a first shaft and a second shaft. The first shaft is the stationary shaft and the second shaft is the rotatable shaft. The first shaft comprises a collar that bridges the gap between the first shaft and the second shaft.

This collar comprises openings that are arranged in a way that the pads of the radial sliding bearing present in the gap between the first shaft, thus the stationary shaft and the second shaft, thus the rotatable shaft, can be exchanged through the openings in the collar.

The first shaft is the outer one of the coaxially arranged shafts.

The first shaft and the second shaft are coaxially arranged within each other. The first shaft is the outer shaft. A radial sliding bearing is present between the outer and the inner shaft.

The outer shaft comprises a collar that comprises openings that are arranged in a way at the bearing pads of the radial sliding bearing present in the gap between the first shaft and the second shaft can be exchanged through the openings in the collar.

The bearing pads of the first sliding bearing are attached to a first shaft.

A first shaft comprises a recess to retain a bearing pad of the first radial sliding bearing, whereby the recess is in communication with the opening and the collar of the first shaft so that the bearing pad can be removed and exchanged by moving it along the recess and through the opening.

The first sliding bearing present between the first shaft and the second shaft comprises bearing pads. The first shaft comprises a recess, whereby a bearing pad can be slid into the recess of the first shaft and the recess keeps the bearing pad in place with the bearing arrangement.

The recess of the first shaft is in communication with the opening in the collar of the first shaft. The bearing pad can be slid along the recess and through the opening in the collar to be exchanged.

Thus, an exchange of the bearing pads of the first radial sliding bearing present between the first shaft and the second shaft is possible through the opening in the collar of the first shaft. Thus, the bearing pads can be exchanged easily by sliding them along the recess and through the opening.

In addition, the bearing pads are kept in place and cannot alter their position along the circumference of the bearing as they are held back in the recess of the first shaft.

The collar of the first shaft comprises a structure that enframes the collar of the second shaft to support the second axial sliding bearing that acts on the collar of the second shaft in the opposite direction than the first axial sliding bearing.

Axial forces between the first and the second shaft need to be supported in both axial directions. Therefore, a first and a second axial sliding bearing are needed. The first shaft comprises a collar and a second shaft comprises a collar. A first axial sliding bearing is arranged at the collar of the first shaft and acts on the collar of the second shaft.

The collar of the first shaft comprises an arrangement of a u-shaped form seen in a cut in parallel to the axis of rotation of the shafts. This u-shaped form enframes the collar of the second shaft.

A second axial sliding bearing is arranged at the u-shaped form of the collar of the first shaft and acts on the opposite side of the collar of the second shaft than the first axial sliding bearing. Thus, axial forces in both directions of the axis of rotation can be supported by the sliding bearing arrangement.

The collar of the first shaft is connected to an axial end of the first shaft.

The collar of the first shaft is connected to an axial end of the first shaft. It bridges the gap between the first shaft and the second shaft and at least partially overlaps with an axial end of the second shaft, and thus with an radial surface of the second shaft.

Thus, an axial bearing can be arranged between the collar of the first shaft and the axial end of the second shaft to support axial loads. An axial end of the first shaft is an end of the first shaft in axial direction of the bearing arrangement.

This axial end of the first shaft may comprise a radial surface and a collar can be connected to the radial surface.

The sliding bearing arrangement comprises a second radial bearing between the first shaft and the second shaft in a certain predetermined distance to the first radial sliding bearing to support radial loads or tilting moments.

For a better support of radial forces and tilting moments in the bearing arrangement, a second radial bearing is present to support the rotatable shaft in respect to the stationary shaft.

The second radial bearing is arranged in a certain distance from the first radial bearing, whereby the distance between the two radial bearings is at least 0.5 m, preferably more than 1 m, and for bigger sliding bearing arrangements of wind turbines most preferably more than 2 m.

Due to the distance between the first and the second radial sliding bearing, a certain lever is present to take up the tilting moments and the radial loads in the bearing.

The first shaft is more rigid and the area of the first radial sliding bearing than the area of the second radial sliding bearing.

The first and the second shaft are hollow shafts with a mainly cylindrical wall, whereby the wall of the first or the second shaft can at least in parts also be conical.

The first shaft and also the second shaft show a certain thickness of the wall of the cylindrical or conical sections. The wall thickness of the shafts varies depending on the position along the axis of rotation.

A first and a second radial sliding bearing are present between the first and the second shaft. The first shaft shows a bigger wall thickness in the area where the first radial sliding bearing is attached to the first shaft.

Thus, the first shaft can take up higher forces in the area of the first radial sliding bearing.

The second shaft is more ridged in the area of the second radial bearing than in the area of the first radial bearing.

Also the second shaft can show a varying thickness of the wall of the shaft. The wall of the second shaft can by cylindrical or conical in parts. The wall thickness of the second shaft can vary along the axis of rotation of the bearing arrangement.

The thickness of the wall of the second shaft is higher in the area of the second radial sliding bearing. Thus, the second shaft can take up higher forces in the area of the second radial sliding bearing than in the area of the first radial sliding bearing.

Thus, the thickness of the shaft and thereby the material needed for the shaft is optimized to the loads and forces that need to be transferred. Thus, the amount of material needed is optimized to the use of the sliding bearing arrangement.

The second radial bearing is a sliding bearing that comprises bearing pads and the bearing pads are arranged in openings in the first shaft.

A second sliding bearing is arranged between the first shaft and the second shaft. The first shaft and the second shaft are coaxially arranged hollow cylindrical shafts. The bearing pads of the second sliding bearing are mounted in openings in the first shaft.

Thus, the bearing pads of the second sliding bearing can be introduced into the bearing through the openings, and can be exchanged through the openings.

At least one axial sliding bearing comprises bearing pads and the bearing pads are arranged in openings in the collar structure of the first shaft.

Axial forces between the first shaft and the second shaft are supported by an axial sliding bearing. The axial sliding bearing is arranged at the collar that is connected to the first shaft.

The collar comprises openings and the bearing pads of the axial bearing can be introduced into the bearing through the openings. The bearing pads of the axial sliding bearing can be exchanged through the openings for the axial sliding pads in the collar.

The second shaft is at least partially arranged radially inward of the first shaft and a collar connected to the first shaft is reaching from the first shaft radially inwards in the direction of the center axis of the first shaft.

Thus, the collar connected to the first shaft, which is the outer shaft, bridges the gap between the first shaft and the second shaft and can support an axial sliding bearing that abuts on the second shaft.

At least one opening in the collar of the first shaft comprises a liquid-tight cover, thus the opening in the collar can be closed in a way that a lubrication present in the bearing can be retained in the bearing arrangement.

Lubrication in the bearing can for example be grease or oil. A liquid-tight cover in the opening of the collar of the first shaft prevents the oil from flowing out of the bearing.

A method is disclosed to exchange a bearing pad of a sliding bearing arrangement of a wind turbine, whereby the arrangement comprises a first shaft and a second shaft, whereby the shafts are arranged coaxially to each other and the one of the shafts is rotatable in respect to the other shaft around a common axis of rotation.

The first radial sliding bearing is arranged between the shafts to support the rotatable shaft by the stationary shaft. The first radial sliding bearing comprises bearing pads.

The first shaft comprises a collar, whereby the collar is arranged mainly perpendicular to the axis of rotation and radially overlaps at least a part of the radial surface of the second shaft.

The collar comprises a first axial sliding bearing to support axial loads between the two shafts. The collar is connected to the first shaft at a first radial position of the collar, and the first axial sliding bearing is connected to the collar at a second radial position of the collar.

The collar comprises an opening in the area between the first and the second radial position. The method comprises the step of exchanging a bearing pad of the first radial sliding bearing through the opening in the collar of the first shaft.

BRIEF DESCRIPTION

Some of the embodiments will be described in detail, with reference to the following figures, wherein like designations denote like members, wherein.

DETAILED DESCRIPTION

Figure 1:
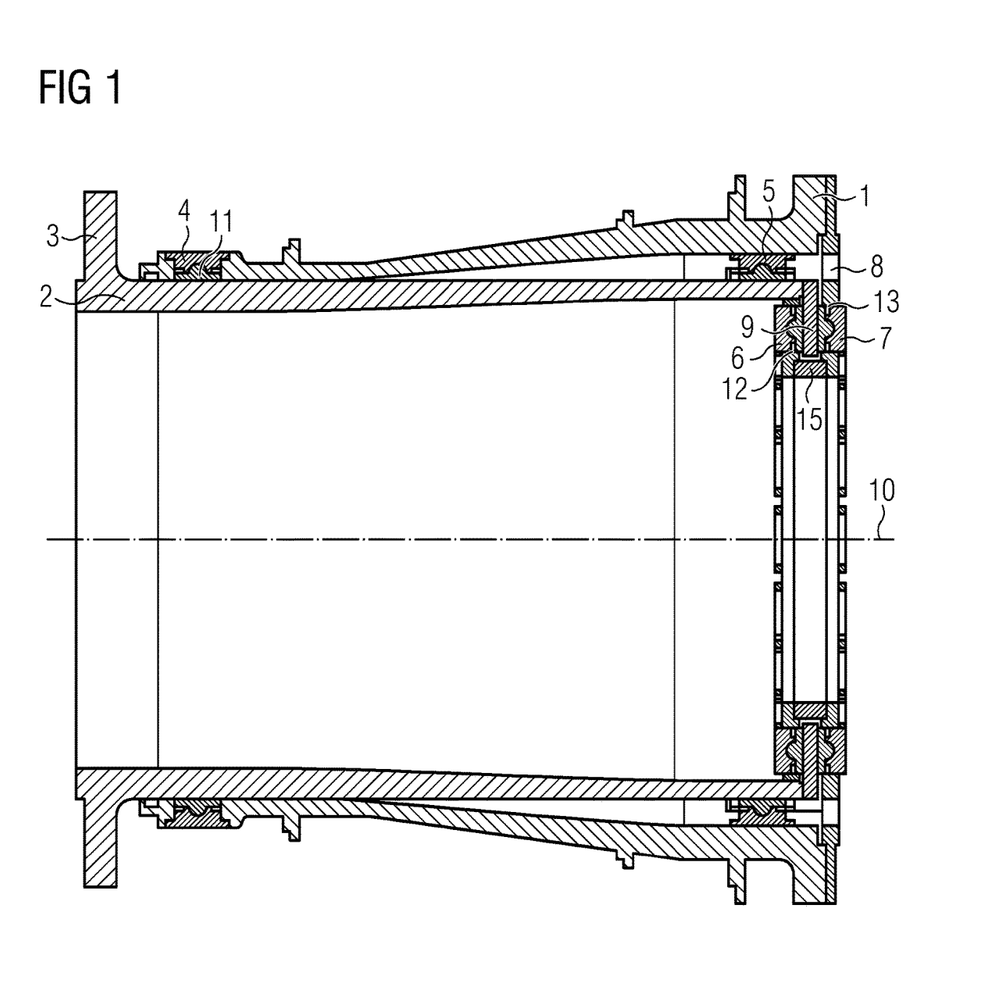
FIG. 1 shows an embodiment of a sliding bearing arrangement.

FIG. 1 shows a sliding bearing arrangement; the sliding arrangement can be used for a wind turbine.

The sliding bearing arrangement comprises a stationary shaft 1 and a rotatable shaft 2, that are arranged coaxially within each other and rotatable in respect to each other around an axis of rotation 10.

The arrangement comprises two radial bearings 4, 5 that support the rotatable shaft 2 in respect to the stationary shaft 1 in radial direction. The radial bearings 4, 5 are sliding bearings.

The stationary shaft 1 comprises a collar that is arranged perpendicular to the axis of rotation 10. The first radial sliding bearing 5 is arranged between the rotatable shaft 2 and the stationary shaft 1.

The collar that is attached to the stationary shaft 1 comprises an opening 8 that allows an exchange of the bearing pad of the first radial sliding bearing 5.

The collar that is connected to the stationary shaft 1 comprises a sliding bearing 7 that supports the rotatable shaft 2 in axial direction. The collar comprises an opening 13 that allows the exchange of the sliding pads of the axial bearing 7. The sliding pads of the axial bearing 7 are arranged in the opening 13 of the collar.

A carrier arrangement 15 is connected to the collar, whereby the carrier arrangement 15 comprises a second axial sliding bearing 6 to support the rotatable shaft 2 in respect to the stationary shaft 1 in axial direction.

The axial sliding bearings 6 and 7 support the rotatable shaft 2 in different axial directions. Thus, the rotatable shaft 2 is fixed in its axial position in respect to the stationary shaft 1.

To support the rotatable shaft 2, the rotatable shaft 2 comprises a collar 9 and the axial sliding bearing 6 and 7 act on the collar 9 of the rotatable shaft 2.

The openings 8 in the collar of the stationary shaft 1 can be closed by a lid so that lubricant present in the sliding bearings 5, 6 and 7 can be retained within the bearing arrangement.

The second radial sliding bearing 4 is arranged in an opening 11 that allows an exchange of the bearing pad of the second radial sliding bearing 4.

The sliding bearing arrangement can be used for a wind turbine, therefore the rotatable shaft 2 comprises a flange 3 that can be connected to the rotor of an electrical generator of a wind turbine.

Figure 2:
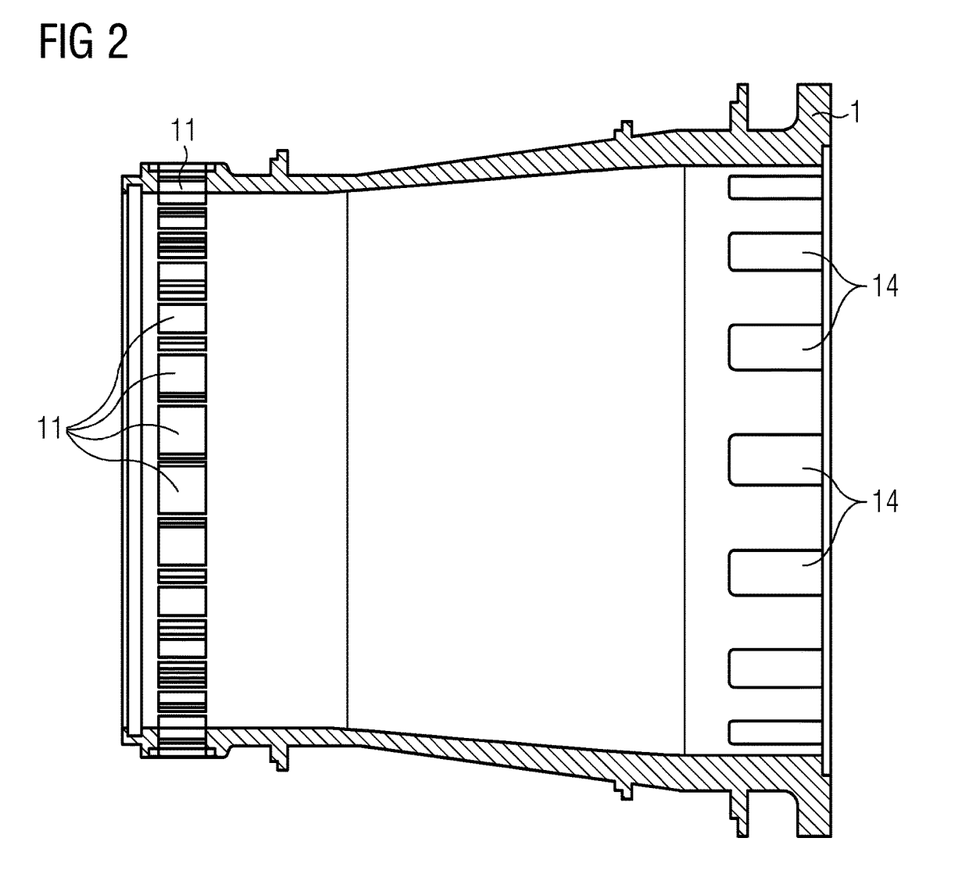
FIG. 2 shows a stationary shaft of an embodiment of the sliding bearing arrangement.

FIG. 2 shows a stationary shaft 1 of a sliding bearing arrangement.

The stationary shaft 1 comprises openings 11, whereby pads of a radial sliding bearing 4 can be arranged in the openings 11.

The stationary shaft 1 comprises recesses 14, whereby the recesses 14 are prepared to hold sliding pads of a first radial sliding bearing 5.

Figure 3:
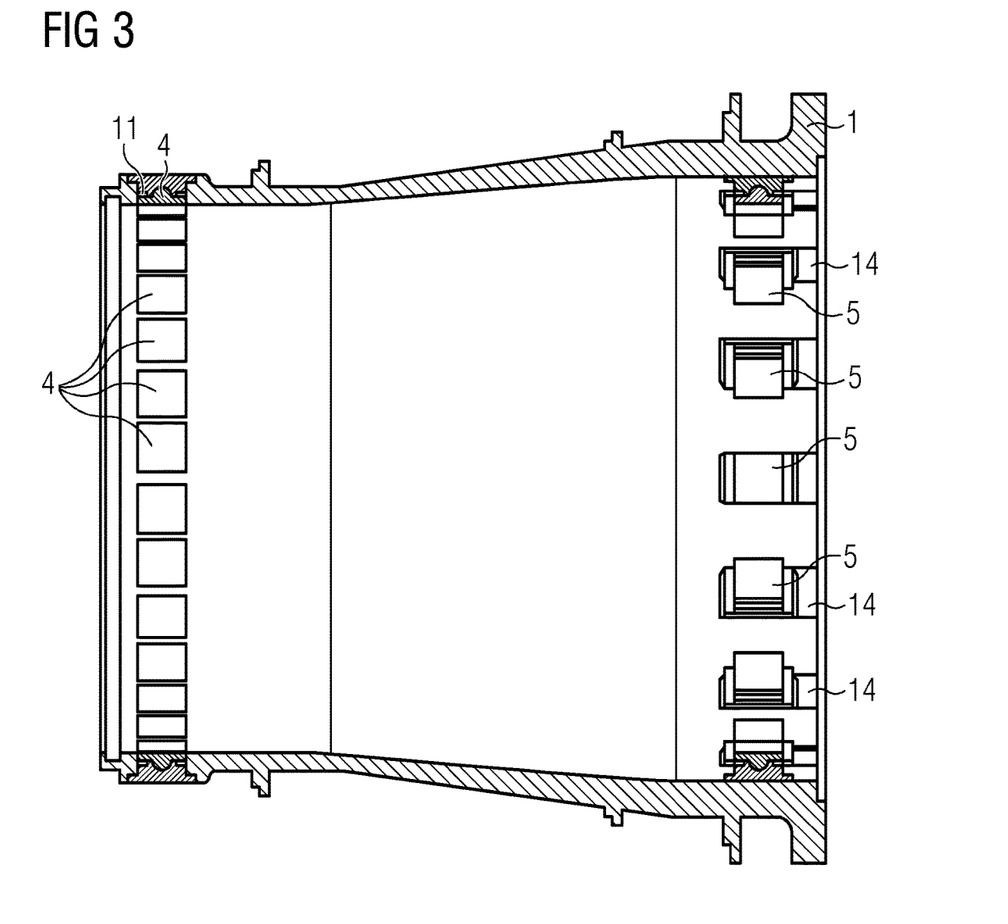
FIG. 3 shows a stationary shaft of an embodiment of the sliding bearing arrangement with the bearing pads arranged at the stationary shaft.

FIG. 3 shows a stationary shaft of the sliding bearing arrangement with the bearing pads arranged at the stationary shaft.

FIG. 3 shows a stationary shaft 1 of the sliding bearing arrangement.

At the radial sliding bearing 4, bearing pads are arranged in the openings 11 of the stationary shaft 1. For the first radial sliding bearing 5, bearing pads are arranged in the recesses 14 of the stationary shaft 1.

The bearing pads of the second radial sliding bearing 4 can be exchanged through the openings 11. The bearing pads of the first radial sliding bearing 5 can be exchanged by sliding them along the recesses 14 in parallel to the inner wall of the stationary shaft 1 out of the recesses 14 at the end of the stationary shaft 1.

Figure 4:
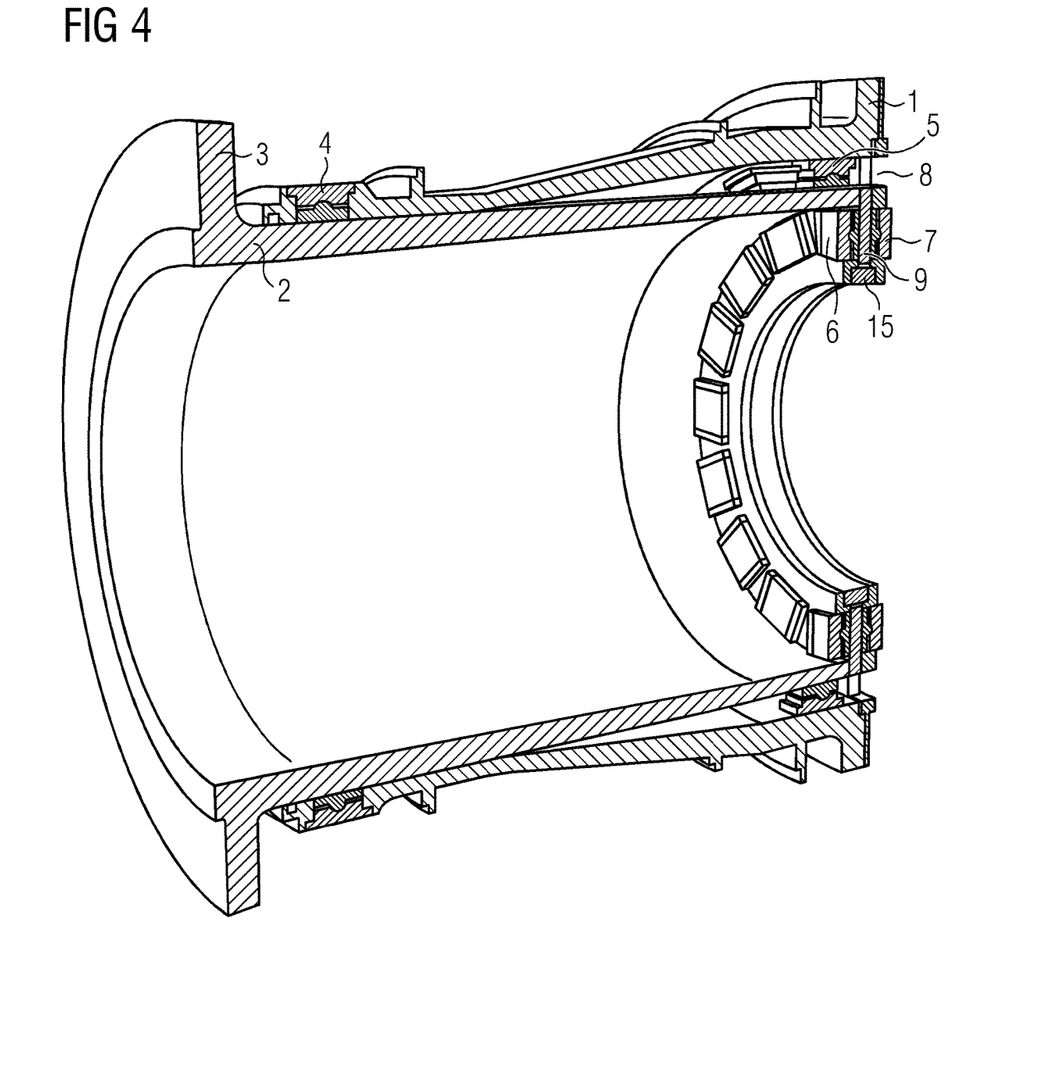
FIG. 4 shows an embodiment of the sliding bearing arrangement in a perspective view.

FIG. 4 shows the sliding bearing arrangement in a perspective view.

The stationary shaft 1 and the rotatable shaft 2 are hollow shafts that are arranged coaxially within each other. The rotatable shaft 2 is supported in respect to a stationary shaft 1 by two radial sliding bearings 4, 5 and by two axial sliding bearings 6, 7.

The second radial sliding bearing 4 is arranged at one end of the stationary shaft 1. The first radial sliding bearing 5 is arranged close to the other end of the stationary shaft 1.

The bearing pads of the second radial sliding bearing 4 can be exchanged from the outside of the stationary shaft 1 in a radial direction. The bearing pads of the first radial sliding bearing 5 are arranged in a radial gap between the stationary shaft 1 and the rotatable shaft 2. The bearing pads of the first radial sliding bearing 5 can be exchanged by sliding them out of the gap between the stationary shaft 1 and the rotatable shaft 2 in axial direction.

At the end of the stationary shaft 1 close to the first radial sliding bearing 5, the stationary shaft 1 comprises a collar that bridges the radial gap and overlaps the rotatable shaft 2. The collar at a stationary shaft 1 is needed to support the first and the second axial sliding bearing 6, 7.

The collar comprises openings 8 that are through-going openings in the collar of the stationary shaft 1, and that are arranged in a way that the bearing pads of the first radial sliding bearing 5 can be exchanged by sliding them out of the gap between the stationary shaft 1 and the rotatable shaft 2 through the openings 8 in the collar.

The collar connected to the stationary shaft 1 comprises a first axial sliding bearing 7 and a support arrangement 15 to support a second axial sliding bearing 6. The pads of the axial sliding bearing 6, 7 can be arranged through openings in their respective support arrangement in axial direction.

Figure 5:
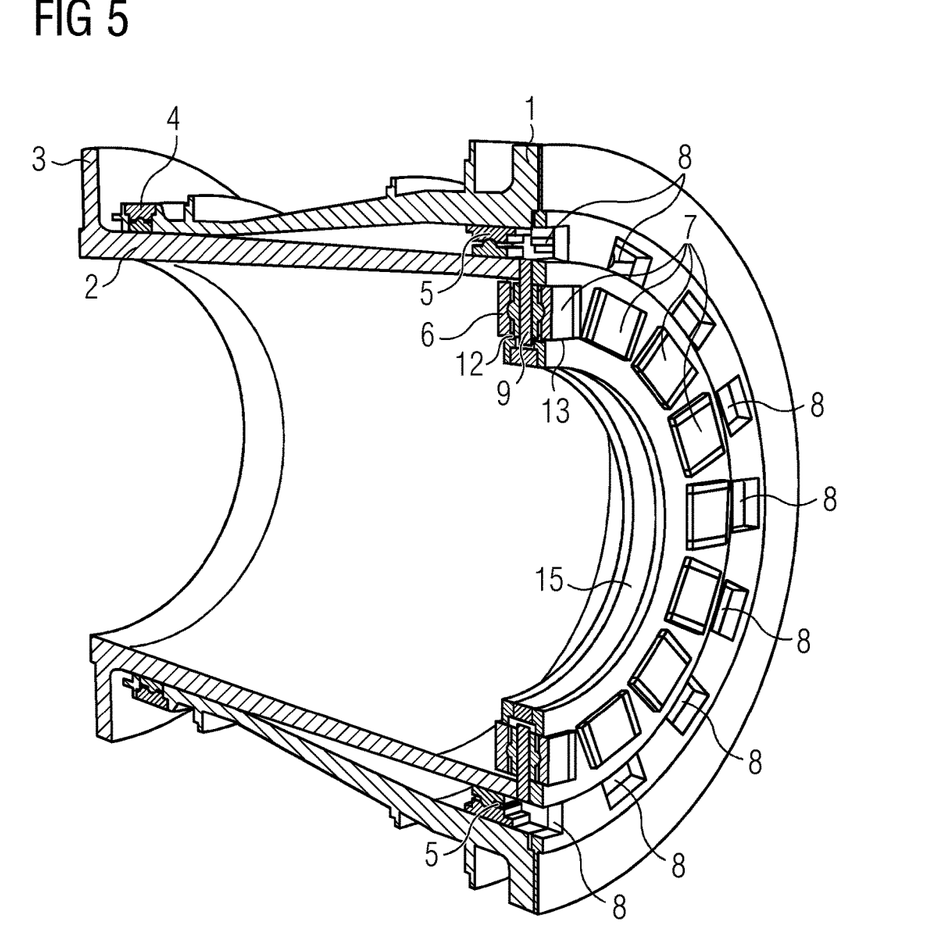
FIG. 5 shows an embodiment of the sliding bearing arrangement in a second perspective.

FIG. 5 shows the sliding bearing arrangement in a second perspective.

FIG. 5 shows the sliding bearing arrangement from the side of the collar attached to the stationary shaft 1. The stationary shaft 1 supports the rotatable shaft 2 that is arranged within stationary shaft 1. The radial forces are supported by radial bearings 4, 5. The axial forces are supported by axial bearings 6, 7. The rotatable shaft 2 comprises a collar 9 and the pads of the axial bearings 6, 7 act on the collar 9 of the rotatable shaft 2. The axial bearing 7 is connected to the collar attached to the stationary shaft 1.

The axial bearing 6 is connected to a support structure that is attached to the collar of the stationary shaft 1. The collar of the stationary shaft 1 comprises openings 8 that are arranged in a way that the bearing pads of the second radial sliding bearing 5 can be exchanged through the openings 8.

The bearing pads of the second radial sliding bearing can be slid out of the radial gap between the stationary shaft 1 and the rotatable shaft 2 and through the opening 8.

Figure 6:
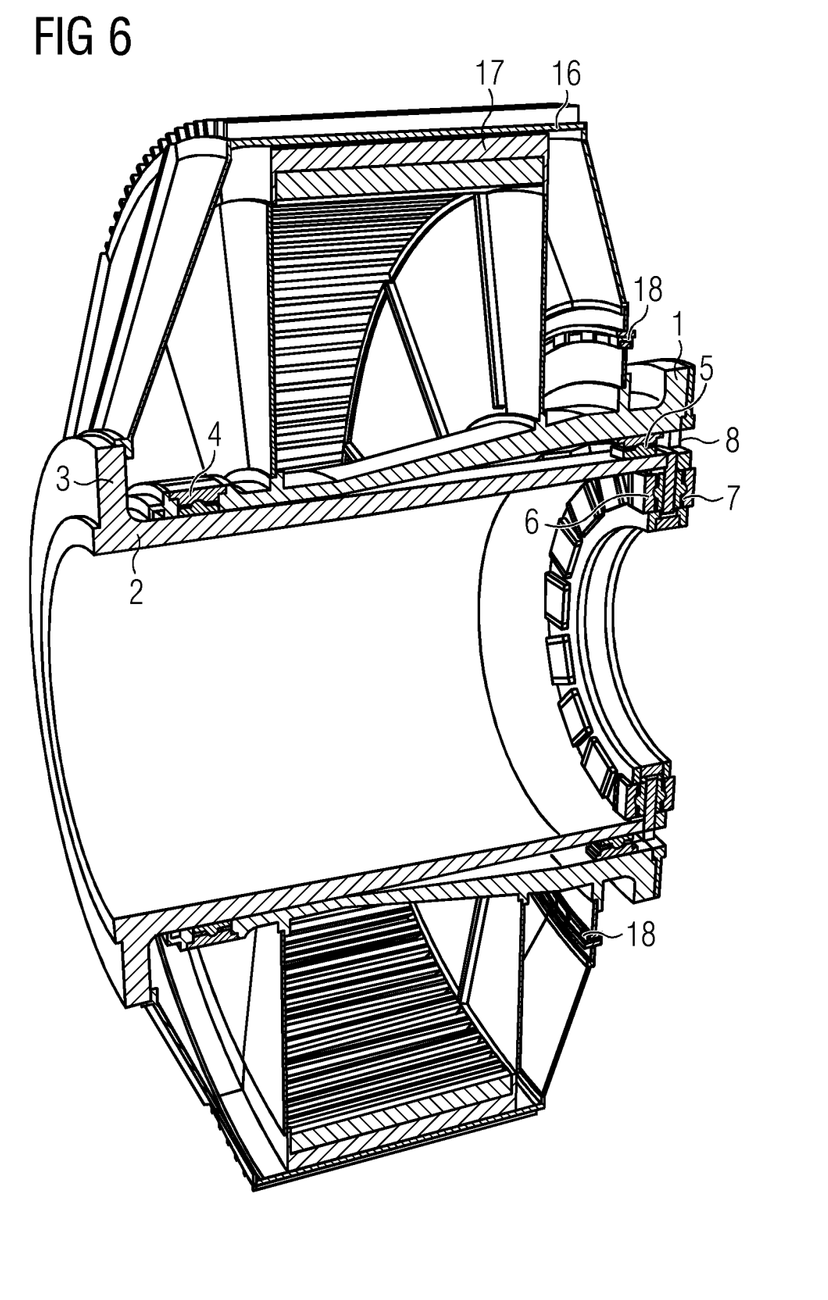
FIG. 6 shows the use of an embodiment of the sliding bearing arrangement in a wind turbine.

FIG. 6 shows the use of a sliding bearing arrangement in a wind turbine.

The sliding bearing arrangement comprises a stationary shaft 1 and a rotatable shaft 2. The stationary shaft 1 is connected to the stator 17 of an electrical generator.

The rotatable shaft 2 is connected to the rotor 16 of the electrical generator. Therefore, the rotatable shaft 2 comprises a flange 3. The rotor of the electrical generator is connected to the flange 3 at one side, and over a support bearing 18 to the stationary shaft 1 at the other end.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A sliding bearing arrangement of a wind turbine, wherein the arrangement comprises a first shaft and a second shaft, the first shaft and the second shaft being arranged coaxially to each other, and one of the first shaft and the second shaft shafts is rotatable with respect to the other shaft around a common axis of rotation,
   wherein a first radial sliding bearing is arranged between the first shaft and the second shaft to support the rotatable shaft by the stationary shaft,
   wherein the first radial sliding bearing comprises bearing pads,
   wherein the first shaft comprises a collar, the collar being arranged mainly perpendicular to the common axis of rotation, and radially overlaps at least a part of a radial surface of the second shaft,
   wherein the collar comprises a first axial sliding bearing to support axial loads between the first shaft and the second shaft,
   wherein the collar is connected to the first shaft at a first radial position of the collar, and the first axial sliding bearing is connected to the collar at a second radial position of the collar,
   wherein the collar comprises an opening in an area between the first radial position and the second radial position, to exchange the bearing pads of the first radial sliding bearing of the sliding bearing arrangement.

2. The sliding bearing arrangement according to claim 1, wherein the second shaft comprises a collar that is arranged mainly parallel to the collar of the first shaft, and that the first axial sliding bearing is located between the two collars.

3. The sliding bearing arrangement according to claim 1, wherein the first shaft is the stationary shaft.

4. The sliding bearing arrangement according to claim 1, wherein the first shaft is an outer one of the coaxially arranged shafts.

5. The sliding bearing arrangement according to claim 1, wherein the bearing pads of the first sliding bearing are attached to the first shaft, and the first shaft comprises a recess to retain a bearing pad of the first radial sliding bearing, wherein the recess is in communication with the opening in the collar of the first shaft, so that the bearing pad can be removed and exchanged by moving the bearing pad along the recess and through the opening.

6. The sliding bearing arrangement according to claim 2, wherein the collar of the first shaft comprises a structure that enframes the collar of the second shaft to support a second axial sliding bearing that acts on the collar of the second shaft in an opposite direction than the first axial sliding bearing.

7. The sliding bearing arrangement according to claim 1, wherein the collar of the first shaft is connected to an axial end of the first shaft.

8. The sliding bearing arrangement according to claim 1, further comprising a second radial bearing between the first shaft and the second shaft in a certain predetermined distance to the first radial sliding bearing, to support radial loads or tilting moments.

9. The sliding bearing arrangement according to claim 8, wherein the first shaft is more rigid in an area of the first radial sliding bearing than in an area of the second radial bearing.

10. The sliding bearing arrangement according claim 9, wherein the second shaft is more rigid in the area of the second radial bearing than in the area of the first radial sliding bearing.

11. The sliding bearing arrangement according to claim 8, wherein the second radial bearing is a sliding bearing that comprises bearing pads, and the bearing pads are arranged in openings in the first shaft.

12. The sliding bearing arrangement according claim 1, wherein at least one axial sliding bearing comprises bearing pads and the bearing pads are arranged in openings in the collar structure of the first shaft.

13. The sliding bearing arrangement according to claim 1, wherein the second shaft is at least partially arranged radially inward of the first shaft, and the collar connected to the first shaft extends from the first shaft radially inward in the direction to the center axis of the first shaft.

14. The sliding bearing arrangement according to claim 1, wherein at least one opening in the collar of the first shaft comprises a liquid tight cover.

15. A method for exchanging a bearing pad of a sliding bearing arrangement of a wind turbine, wherein the sliding bearing arrangement comprises a first shaft and a second shaft, wherein the first shaft and the second shaft are arranged coaxially to each other, and one of the first shaft and the second shaft is rotatable with respect to the other shaft around a common axis of rotation,
  wherein a first radial sliding bearing is arranged between the first shaft and the second shaft to support the rotatable shaft by the stationary shaft,
  wherein the first radial sliding bearing comprises bearing pads,
  wherein the first shaft comprises a collar, wherein the collar is arranged mainly perpendicular to the common axis of rotation, and radially overlaps at least a part of a radial surface of the second shaft,
  wherein the collar comprises a first axial sliding bearing to support axial loads between the first shaft and the second shaft,
  wherein the collar is connected to the first shaft at a first radial position of the collar, and the first axial sliding bearing is connected to the collar at a second radial position of the collar,
  wherein the collar comprises an opening in an area between the first radial position and the second radial position,
  the method comprising the step of:
  exchanging a bearing pad of the first radial sliding bearing through the opening in the collar of the first shaft.

* * * * *